(12) United States Patent
Jeong (10) Patent No.: US 7,134,703 B2
(45) Date of Patent: Nov. 14, 2006

(54) DOUBLE-FOLDING SEAT FOR VEHICLES

(75) Inventor: Chan Ho Jeong, Seoul (KR)

(73) Assignee: Kia Motors Corporation, Seoul (KR)

( * ) Notice: Subject to any disclaimer, the term of this patent is extended or adjusted under 35 U.S.C. 154(b) by 29 days.

(21) Appl. No.: 11/023,680

(22) Filed: Dec. 27, 2004

(65) Prior Publication Data

US 2006/0006687 A1    Jan. 12, 2006

(30) Foreign Application Priority Data

Jul. 9, 2004    (KR) .................. 10-2004-0053314

(51) Int. Cl.
*B60N 2/04* (2006.01)
(52) U.S. Cl. ............... 296/65.03; 296/65.09; 297/336; 248/503.1
(58) Field of Classification Search ............. 296/65.03, 296/65.09; 297/336; 248/503.1
See application file for complete search history.

(56) References Cited

U.S. PATENT DOCUMENTS

| | | | | |
|---|---|---|---|---|
| 4,484,779 A | * | 11/1984 | Suzuki | 297/326 |
| 4,925,229 A | * | 5/1990 | Siebler | 296/65.09 |
| 5,238,285 A | * | 8/1993 | Holdampf et al. | 296/65.03 |
| 6,065,804 A | * | 5/2000 | Tanaka et al. | 297/336 |
| 6,250,704 B1 | * | 6/2001 | Garrido | 296/65.05 |
| 6,880,888 B1 | * | 4/2005 | Rabbach et al. | 297/378.12 |
| 6,974,173 B1 | * | 12/2005 | Yokoyama et al. | 296/65.03 |

FOREIGN PATENT DOCUMENTS

| | | |
|---|---|---|
| DE | 195 14 380 A1 | 11/1995 |
| DE | 198 46 031 C2 | 1/2002 |
| DE | 101 43 721 A1 | 3/2003 |

* cited by examiner

*Primary Examiner*—Dennis H. Pedder
(74) *Attorney, Agent, or Firm*—Morgan Lewis & Bockius LLP

(57) ABSTRACT

A double-folding seat has a seat cushion, a seat back, and a recliner portion. The seat also has a rear locking portion, a force transmitting member, and a front locking portion. The seat back is connected to the seat cushion. The recliner portion is configured to selectively fold the seat back toward the seat cushion. The rear locking portion selectively locks a rear potion of the seat cushion to a vehicle body. A force transmitting member transmits a force generated by folding of the seat back to the rear locking portion. The rear locking portion is configured such that a locking thereof, to the vehicle body, is automatically released by a force transmitted through the force transmitting member. The seat cushion is rotatably connected to the front locking portion and the front locking portion connects a front portion of the seat cushion to the vehicle body.

16 Claims, 8 Drawing Sheets

DOUBLE-FOLDING SEAT FOR VEHICLES

CROSS REFERENCE TO RELATED APPLICATION

This application claims priority of Korean Application No. 10-2004-0053314, filed on Jul. 9, 2004, the disclosure of which is incorporated herein by reference.

TECHNICAL FIELD OF THE INVENTION

Generally, the present invention relates to a double-folding seat. More particularly, the double-folding seat is capable of double-folding by one manipulation and also easily separated from a vehicle body.

BACKGROUND OF THE INVENTION

Typically, a seat of vehicle is composed of a seat cushion for supporting a lower part of an occupant's body, a seat back for supporting an upper part of an occupant's body, and a head rest for supporting an occupant's head. Seats in a second or third array of a multi-purpose vehicle are generally used as seats for occupants, however, in order to load cargo into the vehicle, these seats are typically configured as double-folding seats. Double-folding seats are typically seats in which the seat back folds toward a seat cushion and then folds toward a front direction of the vehicle.

To realize a double-folding seat, a seat back is firstly folded by pulling a recliner strap installed on a rear surface of the seat. A rear latch is released from a striker fixed to a vehicle body by pulling a release strap when the seat back is folded. The seat cushion, that is released from the striker, is then rotated. Accordingly, the seat is double-folded. However, a drawback of this conventional double-folding seat is that the seat requires many manipulations to complete the double-folding process.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

The present invention provides a double-folding seat that can be double-folded by one manipulation. The seat can also be easily separated from a vehicle body. An embodiment of the double-folding seat includes a seat cushion and a seat back that is rotatably connected to the seat cushion. A recliner portion is configured to selectively fold the seat back toward the seat cushion and rotate with the seat back. A cam is fixedly connected to the recliner portion to rotate therewith and a cable link portion is rotatably connected to the seat cushion, the cable link portion rotating in response to a rotation of the cam. A rear locking portion is selectively locking a rear portion of the seat cushion to a vehicle body and a cable connecting the cable link portion and the rear locking portion transmits a force generated by a rotation of the cable link portion to the rear locking portion. Also, a front locking portion is included to which the seat cushion is rotatably connected and connecting a front portion of the seat cushion to the vehicle body. When the seat back is folded by an operation of the recliner portion, a force generated by rotation of the seat back is transmitted to the rear locking portion via the recliner portion, the cam, the cable link portion, and the cable, so that the rear locking portion is automatically released from the vehicle body by a force transmitted through the cable.

According to another embodiment, the double-folding seat further includes an elastic member for providing a force to rotate the seat cushion with respect to the front locking portion. The rear locking portion can be rotatably connected to the seat cushion. The rear locking portion and the front locking portion can be connected to each other through a connecting bar, such that the rear locking portion rotates toward the seat cushion when the seat cushion rotates with respect to the front locking portion.

In a further embodiment, the rear locking portion includes a mounting plate connected to the seat cushion and a rear locking releasing lever, one end of which is connected to the cable and the other end of which is fixedly connected to a lever rotating shaft that is rotatably connected to the mounting plate. A rear locking plate rotatably connected to the mounting plate and configured to be selectively locked to the vehicle body in response to a rotation thereof. A locking cam is fixedly connected to the lever rotating shaft to rotate with the rear locking releasing lever. The locking cam also selectively blocks rotation of the rear locking plate depending on a rotation thereof, wherein blocking rotation of the rear locking plate is released when the locking cam rotates by the force transmitted through the cable. Also, an elastic member elastically connects the locking cam and the rear locking plate such that the rotation of the locking cam causes a rotation of the rear locking plate.

According to another embodiment, a rear striker can be fixed to the vehicle body and the rear locking plate can be configured to be selectively locked to the rear striker. The mounting plate of the rear locking portion can be rotatably connected to the seat cushion. The mounting plate and the front locking portion can be connected to each other through a connecting bar, such that the mounting plate rotates toward the seat cushion when the seat cushion rotates with respect to the front locking portion. The front locking portion may be configured to be separable from the vehicle body.

The front locking portion can include a main bracket to which the seat cushion is rotatably connected. A first front locking plate is rotatably connected to the main bracket and configured to be selectively locked to the vehicle body in response to a rotation thereof. A second front locking plate is fixedly connected to a rotating shaft that is rotatably connected to the main bracket and configured to be selectively locked to the vehicle body in response to a rotation thereof. A front locking releasing lever rotates the first front locking plate such that the first front locking plate is released from the vehicle body. A rotating cam engages with the first front locking plate to rotate with the first front locking plate and fixedly connects to the rotating shaft so that a rotation of the rotating cam results in a rotation of the second front locking plate that causes the second front locking plate to be released from the vehicle body.

A first front striker and a second front striker may be fixed to the vehicle body. The first front locking plate can be configured to be selectively locked to the first front striker and the second front locking plate may be configured to be selectively locked to the second front striker. The front locking portion may further include a roller that is connected to the main bracket.

In another embodiment, a double-folding seat includes a seat cushion, a seat back, a recliner portion, a rear locking portion, a force transmitting member, and a front locking portion. The seat back is connected to the seat cushion. The recliner portion is configured to selectively fold the seat back toward the seat cushion. The rear locking portion selectively locks a rear portion of the seat cushion to a vehicle body. A force transmitting member transmits a force generated by a folding of the seat back to the rear locking portion. The rear locking portion is configured such that the rear locking portion is automatically released from the vehicle body by a force transmitted through the force transmitting member. The seat cushion is rotatably connected to the front locking portion and the front locking portion connects a front portion of the seat cushion to the vehicle body.

According to an embodiment, the force transmitting member can include a cam fixedly connected to the recliner portion to rotate and rotatable therwith. A cable link portion rotatably connected to the seat cushion, the cable link portion rotating in response to a rotation of the cam. And a cable connecting the cable link portion and the rear locking portion to transmit a rotating force of the cable link portion to the rear locking portion.

BRIEF DESCRIPTION OF THE DRAWINGS

The accompanying drawings illustrate exemplary embodiments of the present invention, and taken together with the description, serve to explain the principles of the present invention, wherein.

DETAILED DESCRIPTION OF THE EMBODIMENTS

Figure 1:
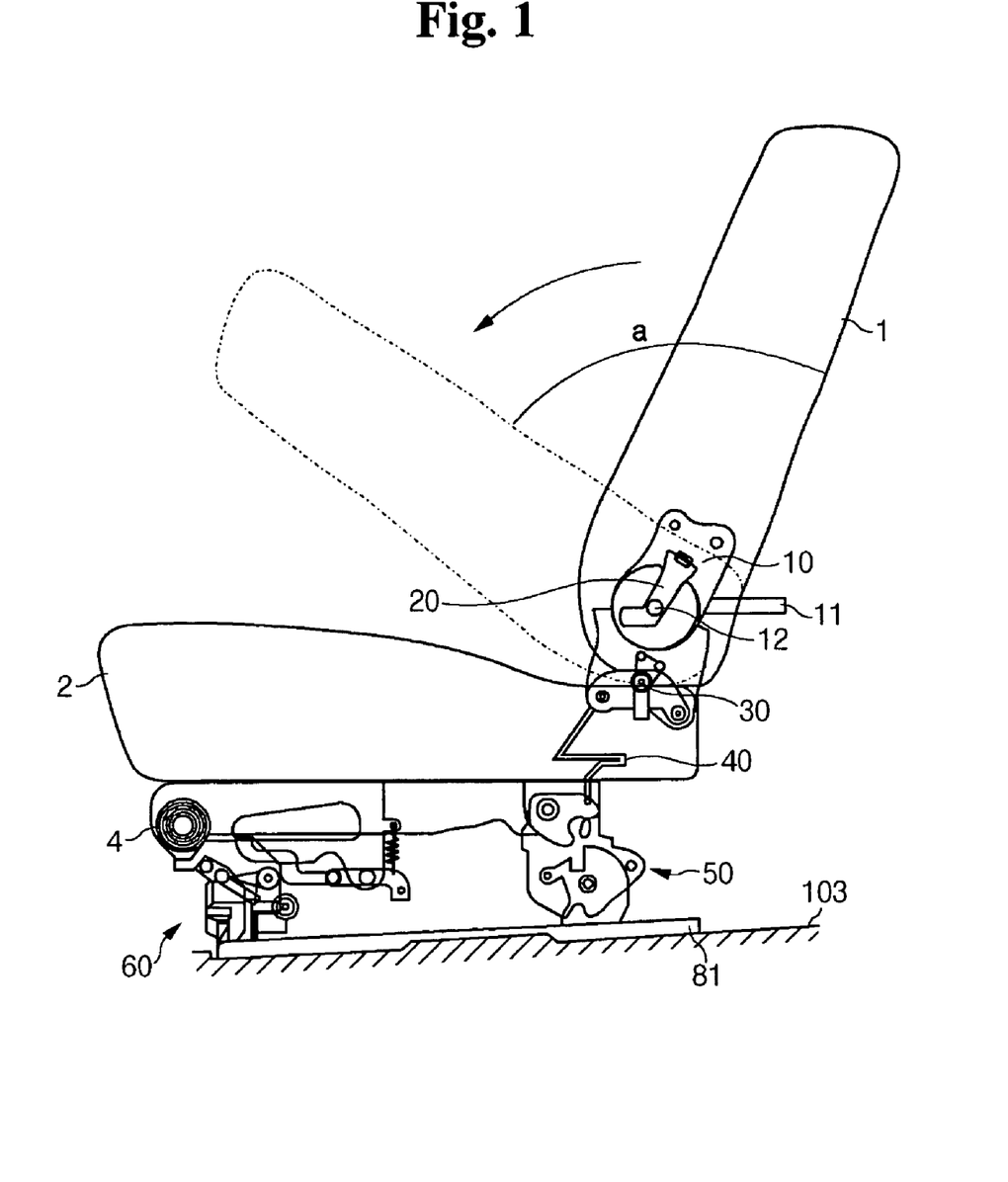
FIG. 1 schematically shows a double-folding seat according to an embodiment of the present invention.

As shown in FIG. 1, a double-folding seat includes a seat back 1, a seat cushion 2, a recliner portion 10, a force transmitting member 200, a rear locking portion 50, and a front locking portion 60. The seat back 1 is rotatably connected to the seat cushion 2. The recliner portion 10 is configured to selectively fold the seat back 1 toward the seat cushion 2 and rotates with the seat back 1. The recliner portion 10 is coupled to a side surface of the seat back 1. The recliner portion 10 is also folded with the seat back 1 in a front direction with respect to a hinge point 12 by release of locking that is achieved by a recliner lever 11. The recliner portion 10 can include a locking device that is configured to release a locking state by a manipulation of the recliner lever 11. When the locking state of the locking device is released by the recliner lever 11, the seat back 1 is folded toward the seat cushion 2 by an elastic force of a spiral spring 101. Similar recliner devices to that used in the present invention for controlling a folding of a seat back is well known in the art and therefore will not be described in further detail herein. Furthermore, detailed explanation of the recliner lever 11, the locking device, and the spiral spring will be omitted from the current discussion because these devices are well know in the art as will be appreciated by one of ordinary skill in the art.

Figure 2A:
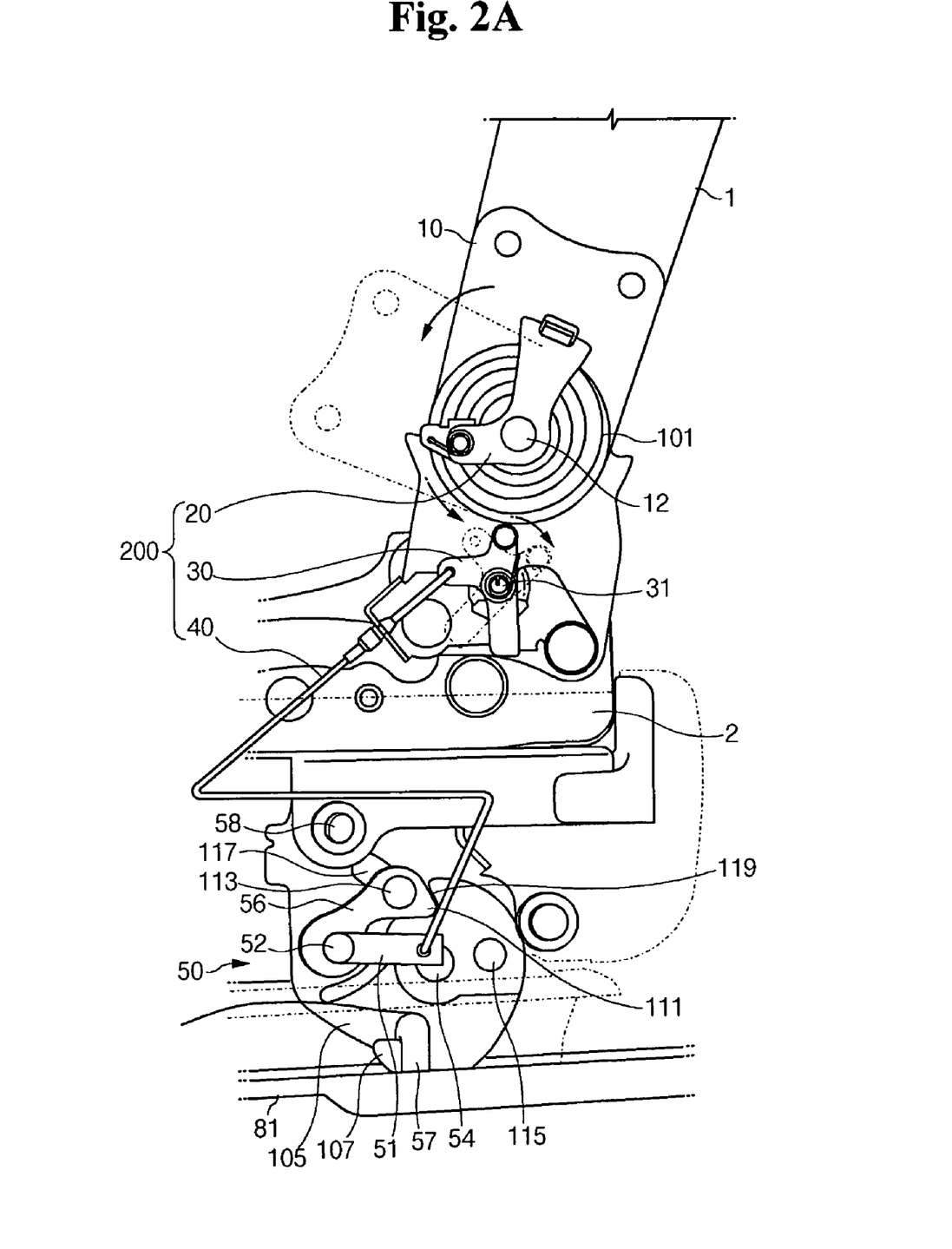
FIG. 2A is a partial view of a double-folding seat according to an embodiment of the present invention.
Figure 2B:
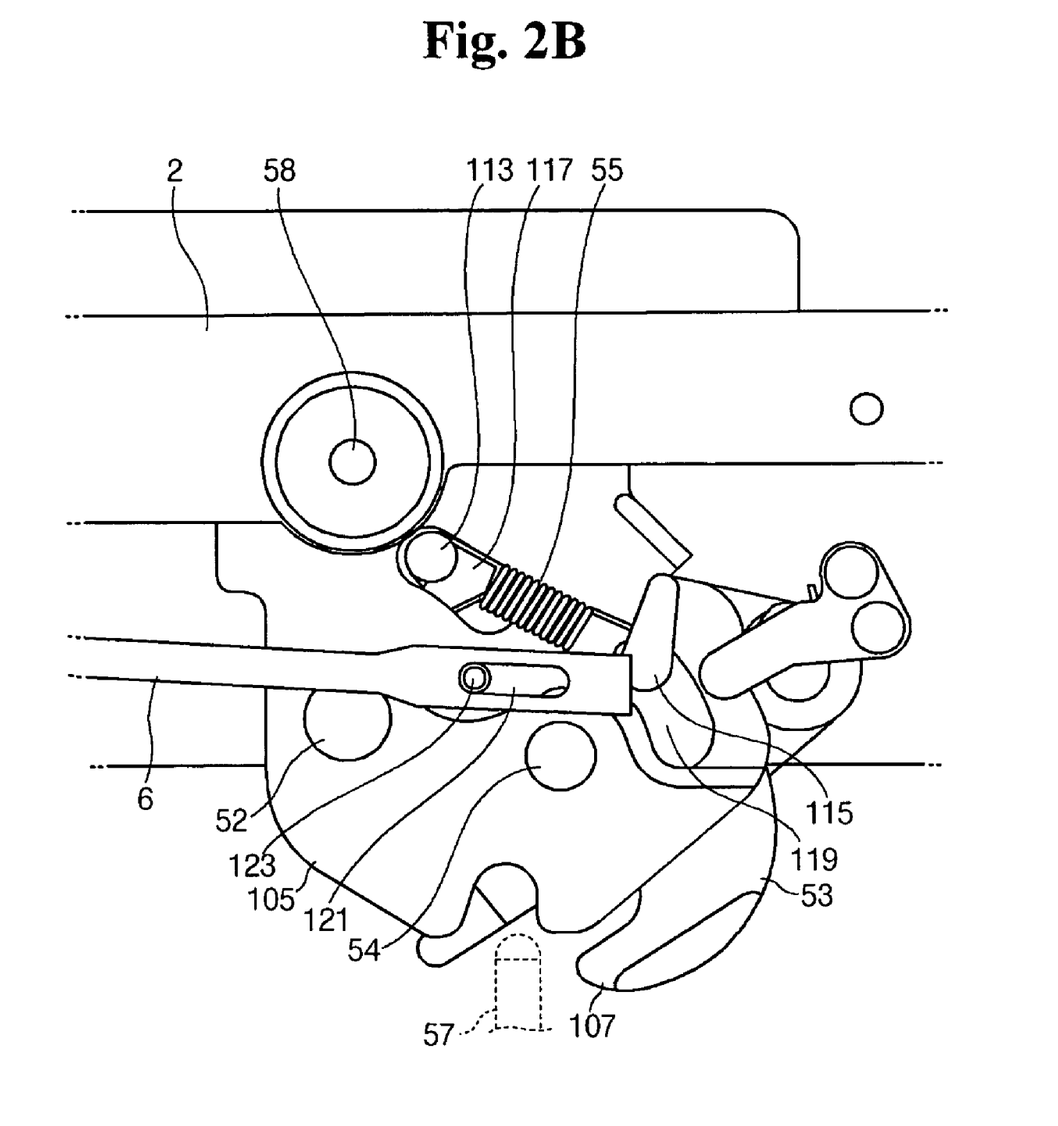
FIG. 2B shows a rear locking portion of the double-folding seat according to an embodiment of the present invention.

The force transmitting member 200 transmits a force generated by a folding of the seat back 1 to the rear locking portion 50. The rear locking portion 50 is configured such that it locks to the vehicle body 103 and is automatically released by a force transmitted through the force transmitting member 200. The force transmitting member 200 may comprise a cam 20, a cable link portion 30, and a cable 40. The cam 20 is fixedly connected to a lower portion of the recliner portion 10, and the cam 20 rotates with the recliner portion 10. That is, if the locking state of the recliner portion 10 is released through an operation of the recliner lever 11, the seat back 1 and the recliner portion 10 rotates in a counter clockwise direction in FIG. 2 with respect to the hinge point 12 thereby being folded so that the cam 20 also rotates in the same direction.

The cable link portion 30 is configured to rotate in response to the rotation of the cam 20. For example, the cable link portion 30 is installed to the seat cushion 2 such that it is positioned below the cam 20. The cable link portion 30 is rotatably connected through a hinge point 31 to a side portion of the seat cushion 2. When the cam 20 rotates, an end of the cam 20 collides with the cable link portion 30 so that the cable link portion 30 rotates in response to the rotation of the cam 20. That is, referring to FIG. 2, when the cam 20 rotates in a counter clockwise direction more than a specific angle, the cable link portion 30 is urged to rotate in a clockwise direction with respect to the hinge point 31 by the cam 20.

The cable 40 connects the cable link portion 30 and the rear locking portion 50 to transmit a force generated by a rotation of the cable link 30 to the rear locking portion 50. The cable 40 is connected, respectively, to the cable link portion 30 and the rear locking portion 50. One end of the cable 40 is connected to the cable link portion 30, so that the cable 40 moves toward the cable link portion 30 in response to the rotation of the cable link portion 30.

The rear locking portion 50 selectively locks a rear portion of the seat cushion 2 to a vehicle body 103. The rear locking portion 50 is rotatably connected to a rear lower portion of the seat cushion 2 through a hinge point 58, and the rear locking portion 50 may fix a rear portion of the seat cushion 2 to the vehicle body 103. Meanwhile, the rear locking portion 50 is connected to the cable 40, and the rear locking portion 50 is configured to release a locking with the vehicle body 103 by a movement of the cable 40.

The seat cushion 2 is rotatably connected to the front locking portion 60. For example, the seat cushion 2 is rotatably connected to a front hinge shaft 4 that is fixedly connected to the front locking portion 60. The front locking portion 60 is rotatably connected to a front lower portion of the seat cushion 2 through the front hinge shaft 4. The front locking portion 60 fixes a front portion of the seat cushion 2 to the vehicle body 103. In an embodiment of the present invention, the front locking portion 60 is configured to be separable from the vehicle body 103.

In the double-folding seat according to an embodiment of the present invention, the seat back 1 is folded by a manipulation of the recliner lever 11, and the cam 20 and the cable link portion 30 simultaneously rotate by the folding of the seat back 1. In addition, the locking state of the rear locking portion 50 is automatically released by movement of the cable 40 due to the rotation of the cable link portion 30. An angle "a," FIG. 1, is a minimum rotating angle of the seat back 1 by which the locking state of the rear locking portion 50 can be released. For example, the angle "a" is not less than about 70 degrees and not more than about 80 degrees.

Figure 3:
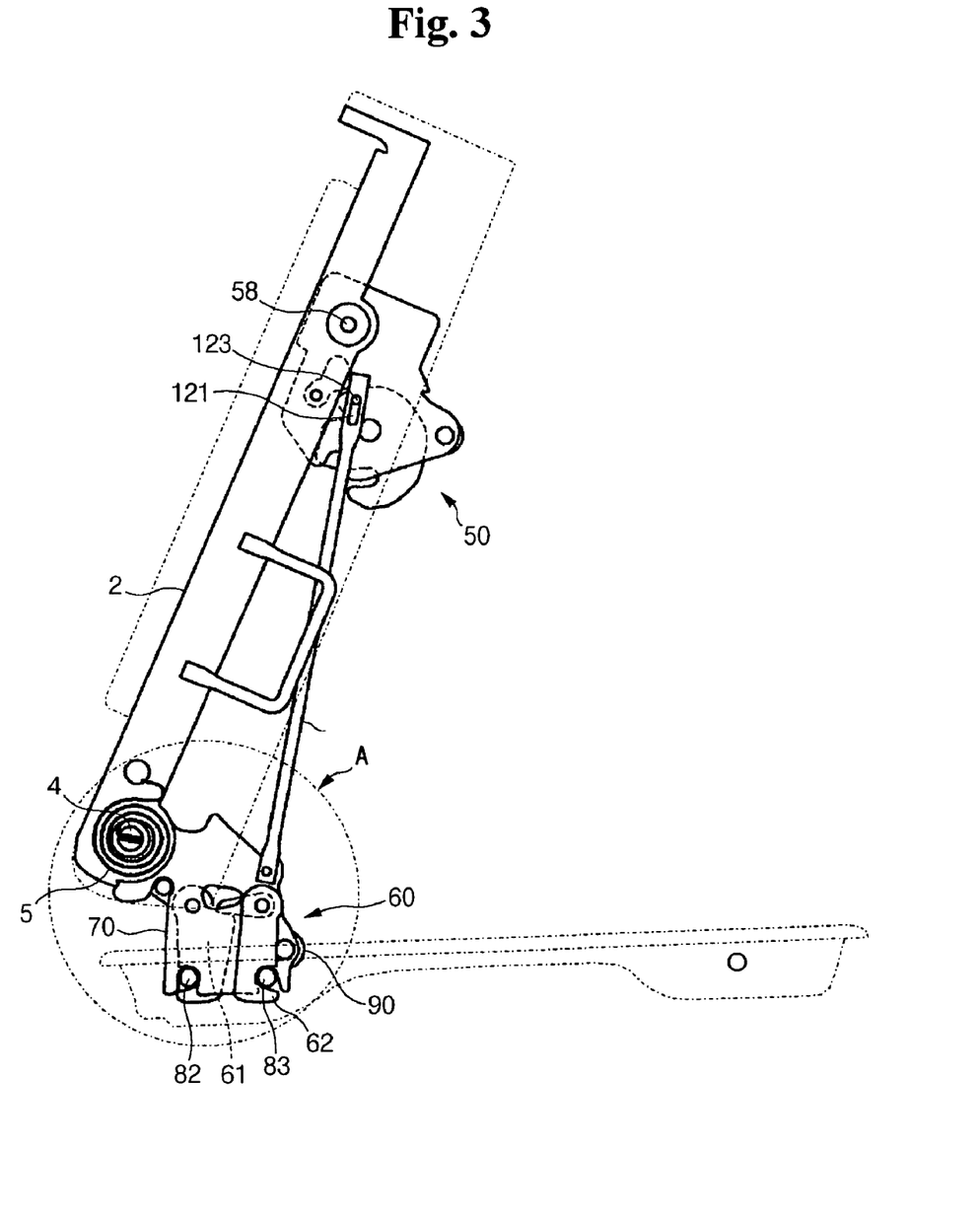
FIG. 3 shows a seat cushion of a double-folding seat being folded according to an embodiment of the present invention.

In addition, in the double-folding seat according to an embodiment of the present invention, the seat cushion 2 is automatically folded with respect to the front hinge shaft 4 when the locking state of the rear locking portion 50 is released. For this automatic folding of the seat cushion 2, the seat cushion 2 is rotatably connected through the front hinge shaft 4 to the front locking portion 60, and the front hinge shaft 4 and the seat cushion 2 are connected to each other through an elastic member 5, e.g., a spiral spring or the like. Hereinafter, for convenience, the reference numeral 5 is referred to as a spiral spring. The spiral spring 5 provides a force to rotate the seat cushion 2 with respect to the front locking portion 60. Referring to FIG. 3, the spiral spring 5 is connected respectively to the front hinge shaft and the seat cushion 2 such that a biasing force of the spiral spring 5 urges the seat cushion 2 to rotate counter clockwise, in FIG. 3, with respect to the front hinge shaft 4. Therefore, when the locking state of the rear locking portion 50 is released by the folding of the seat back 1, the seat cushion 2 is automatically folded with respect to the front hinge shaft 4, thereby realizing the double-folding seat. That is, the seat back 1 is folded by an operation of the recliner portion 10, and a force generated by a folding of the seat back 1 is transmitted to the rear locking portion 50 via the recliner portion 10, the cam 20, the cable link portion 30, and the cable 40. The locking of the rear locking portion 50 is automatically released by a force transmitted through the cable 40.

Referring to FIGS. 2A and 2B, operations of the rear locking portion 50 of the double-folding seat according to an embodiment of the present invention will be explained in detail. As above-stated, the rear locking portion 50 fixes a rear portion of the seat cushion 2 to the vehicle body 103, and is configured to be released by the movement of the cable 40. According to an embodiment of the present invention, the rear locking portion 50 includes a rear locking releasing lever 51, a rear locking plate 53, and a locking cam 56. The rear locking portion 50 can further include a mounting plate 105 that is rotatably connected to the seat cushion 2 through a rotating point 58, and the rear locking releasing lever 51, the rear locking plate 53, and the locking cam 56 can be connected to the mounting plate 105.

One end of the rear locking releasing lever 51 is connected to the cable 40 and the other end thereof is fixedly connected to a lever rotating shaft 52 that is rotatably connected to the mounting plate 105. Therefore, the rear locking releasing lever 51 rotates with respect to the lever rotating shaft 52 in response to the movement of the cable 40. The rear locking plate 53 is rotatably connected through a locking hinge point 54 to the mounting plate 105. The rear locking plate 53 is configured to be selectively locked to a rear striker 57 that is fixed to a striker cover 81. The striker cover 81 and the rear striker 57 are fixed to the vehicle body 103, so that the rear locking plate 53 can be selectively locked to the vehicle body 103. In an embodiment of the present invention, the rear locking plate 53 is provided with a hooking portion 107 for a connection with the rear striker 57. The rear striker 57 may have a ring shape.

One end of the locking cam 56 is fixedly coupled to the lever rotating shaft 52, so that the locking cam 56 rotates with the rear locking releasing lever 51. A protrusion 111 is formed on the other side of the locking cam 56, and the protrusion 111 may be inserted into an indentation 109 formed on the rear locking plate 53. Therefore, as shown in FIG. 2A, when the protrusion 111 of the locking cam 56 is inserted into the indentation 109 of the rear locking plate 53, a rotation of the rear locking plate 53 is restricted by the locking cam 56. Accordingly, a locking state of a rear portion of a double-folding seat according to an embodiment of the present invention may be maintained. That is, the locking cam 56 is fixedly connected to the lever rotating shaft 52 to rotate with the rear locking releasing lever 51, and the locking cam 56 selectively blocks a rotation of the rear locking plate 53 depending on a rotation thereof. A blocking of a rotation of the rear locking plate 53 is released by a rotation of the locking cam 56 by the force transmitted through the cable 40.

The locking cam 56 and the rear locking plate 53 are, as shown in FIG. 2B, connected to each other through an elastic member 55, e.g., a return spring. Hereinafter, for convenience, the reference numeral 55 is referred to as a return spring. The return spring 55 elastically connects the locking cam 56 and the rear locking plate 53 such that a rotation of the locking cam 56 causes a rotation of the rear locking plate 53. In an embodiment of the present invention, the return spring 55 is connected respectively to a connecting protrusion 113 of the locking cam 56 and a connecting protrusion 115 of the rear locking plate 53. As shown in FIG. 2B, the connecting protrusion 113 of the locking cam 56 is disposed in a slot 117 formed in the mounting plate 105, and the connecting protrusion 115 of the rear locking plate 53 is disposed in a slot 119 formed in the mounting plate 105.

FIG. 2A shows a state in which the rear locking plate 53 is locked to the rear striker 57. If the seat back 1 is folded by more than a specific angle in a state shown in FIG. 2A, the cable 40 moves in an upward direction (in FIG. 2A). Therefore, the rear locking releasing lever 51 rotates in a counter clock wise direction (in FIG. 2A) with respect to the lever rotating shaft 52, so that the locking cam 56 that is fixedly connected to the lever rotating shaft 52 also rotates in the same direction. Accordingly, the protrusion 111 of the locking cam 56 obviates from the indentation 109 of the rear locking plate 53. In addition, the locking cam 56 rotates with respect to the lever rotating shaft 52, and accordingly the connecting protrusion 113 moves along the slot 117 of the mounting plate 105. Consequently, the rear locking plate 53 is urged to rotate in a counter clockwise direction (in FIG. 2A) with respect to the locking hinge point 54 by a biasing force of the return spring 55. FIG. 2B shows a state in which the locking cam 56 has rotated maximally, and in this situation the hooking portion 107 of the rear locking plate 53 is completely released from the rear striker 57, so that the locking state of the rear locking portion 50 is released.

If the locking state of the rear locking portion 50 is released, as shown in FIG. 3, the seat cushion 2 is folded with respect to the front hinge shaft 4, which is positioned at a front lower portion of the seat cushion 2, by an elastic force of the spiral spring 5. Consequently, the seat back 1 and the seat cushion 2 are sequentially folded by manipulation of the recliner lever 11, thereby realizing a double-folding seat. The rear locking portion 50 is connected via a connecting bar 6 to the front locking portion 60. As shown in FIGS. 2B and 3, a slot 121 is formed in one end of the connecting bar 6 along its longitudinal direction, and a connecting protrusion 123 formed on the mounting plate 105 of the rear locking portion 50 is slidably inserted into the slot 121. The other end of the connecting bar 6 is rotatably connected to the front locking portion 60. Therefore, as shown in FIG. 3, an end of the slot 121 of the connecting bar 6 contacts the connecting protrusion 123 when a double-folding seat is double-folded, so that the rear locking portion 50 rotates with respect to the rotating point 58 toward the front locking portion 60 by a specific angle. That is, the rear locking portion 50 is rotatably connected to the seat cushion 2, and the rear locking portion 50 and the front locking portion 60 are connected to each other through the connecting bar 6. Accordingly, the rear locking portion 50 rotates toward the seat cushion 2 when the seat cushion 2 rotates with respect to the front locking portion 60.

The front locking portion 60 connects a front lower portion of the seat cushion 2 to the vehicle body 103 and is configured such that a locking state thereof can be selectively released. In an embodiment of the present invention, the front locking portion 60 includes a main bracket 70, a roller 90, a first front striker 82, a second front striker 83, a first front locking plate 61, a rotating cam 64, and a second front locking plate 62. The main bracket 70 is connected to the front hinge shaft 4 at a lower portion thereof.

Figure 4A:
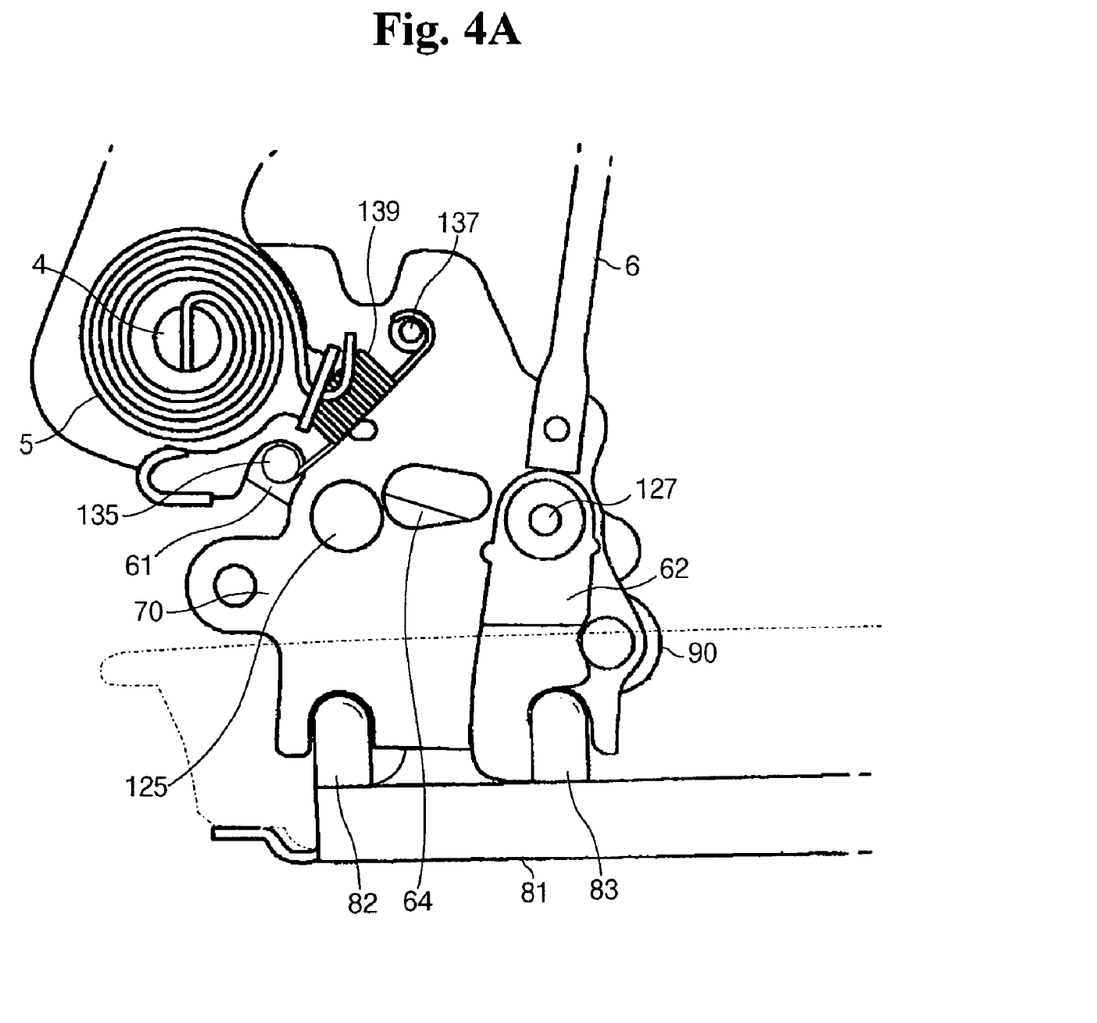
FIGS. 4A and 4B show a locking state of a front locking portion of a double-folding seat according to an embodiment of the present invention.
Figure 4B:
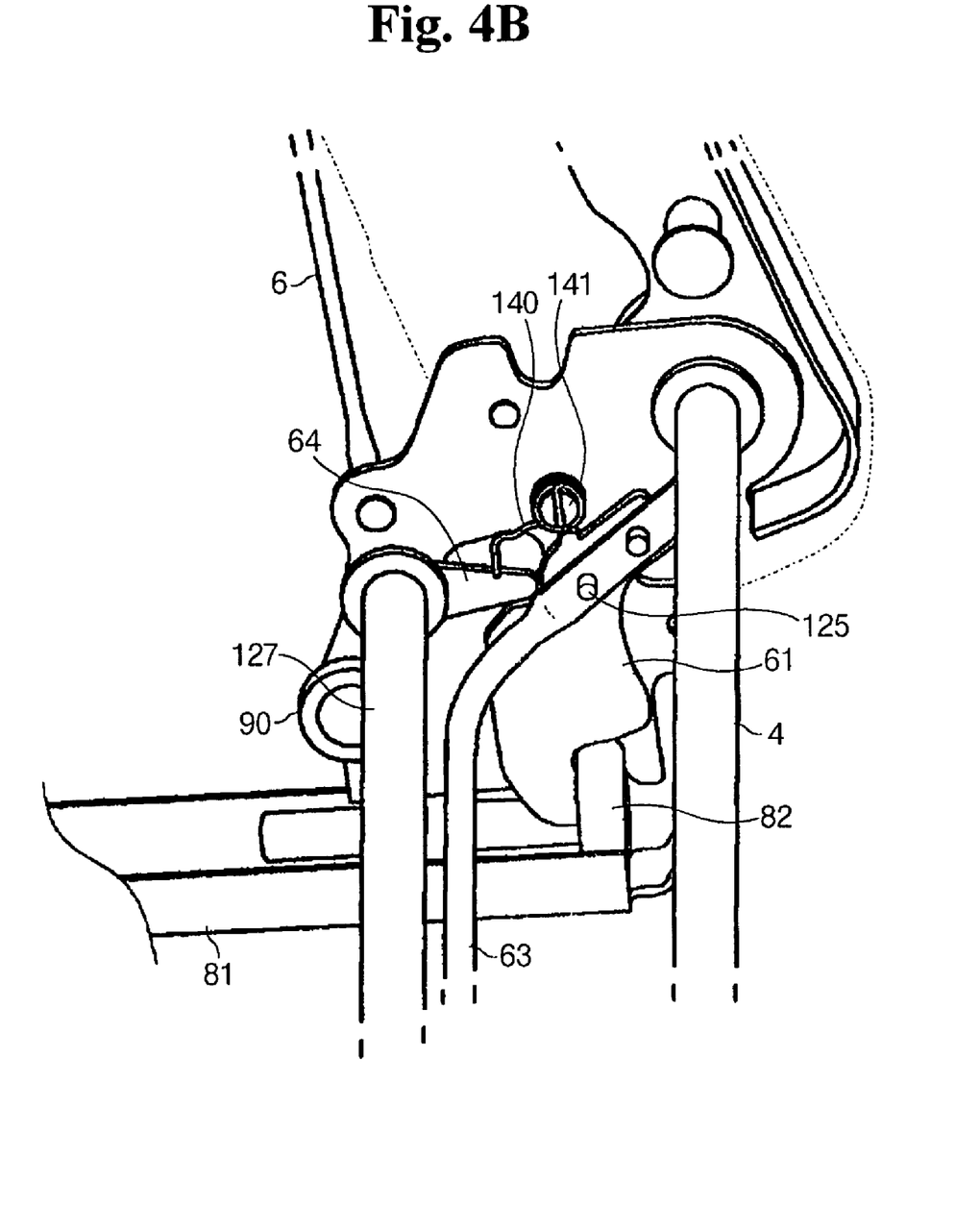

The first front striker 82 and the second front striker 83 are coupled to the striker cover 81 that is attached to the vehicle body 103, e.g., a floor panel. That is, the first and second front strikers 82 and 83 are fixed to the vehicle body 103, and consequently the first and second front locking plates 61 and 62 are selectively connectable to the vehicle body 103. The first front striker 82 and the second front striker 83 may have a ring shape. The roller 90 is connected to a lower portion of the main bracket 70. Because the roller 90 is provided, the double-folding seat can be easily moved after it is separated from the vehicle body. The first front locking plate 61 and the second front locking plate 62 are rotatably connected respectively to the main bracket 70. As shown in FIGS. 4A and 4B, the first front locking plate 61 and the second front locking plate 62 may be disposed on each side of the main bracket 70. The first front locking plate 61 is rotatably connected through a hinge shaft 125 to the main bracket 70, and the second front locking plate 62 is rotatably connected through a hinge shaft 127 to the main bracket 70.

As shown in FIG. 4B, a front locking releasing lever 63 is fixedly coupled to the hinge shaft 125 that is fixedly coupled to the first front locking plate 61. Therefore, by rotating the front locking releasing lever 63, the first front locking plate 61 can be rotated with respect to the hinge shaft 125.

Figure 5A:
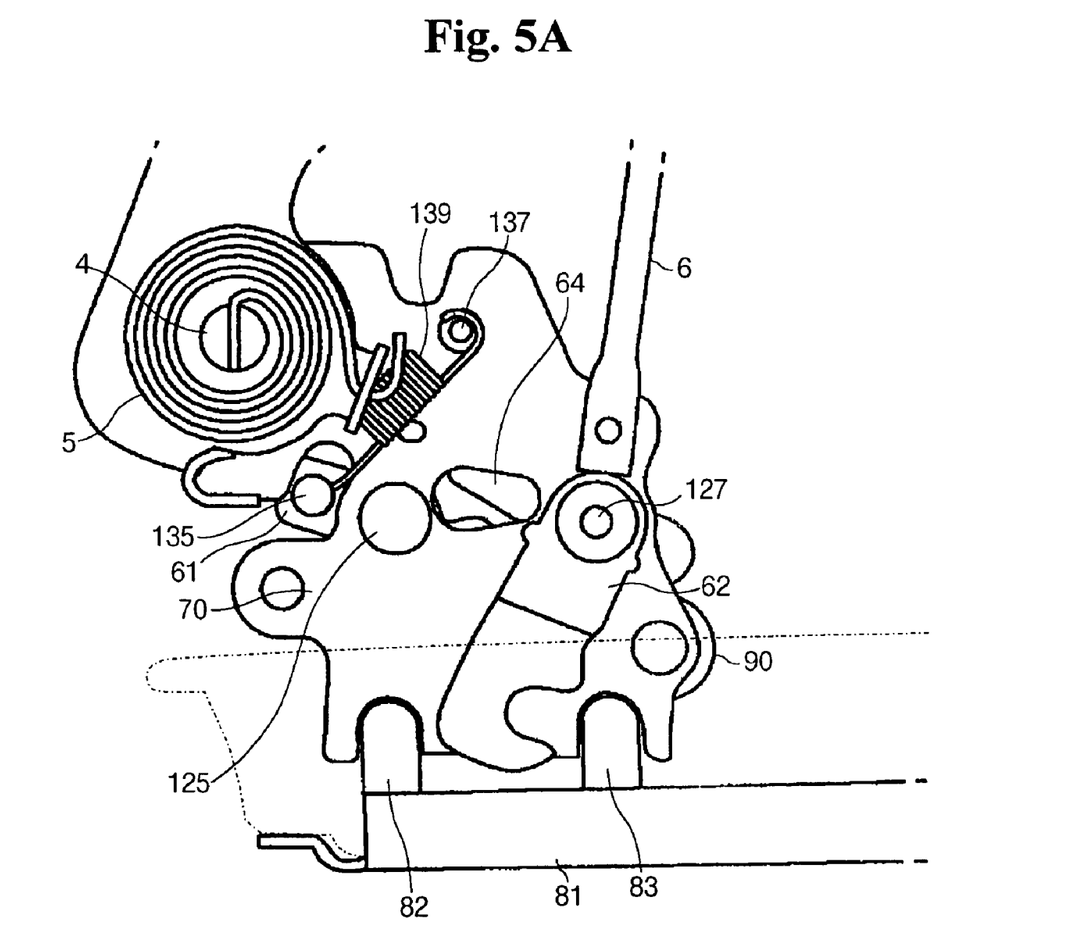
FIGS. 5A and 5B show a unlocked state of a front locking portion of a double-folding seat according to an embodiment of the present invention.
Figure 5B:
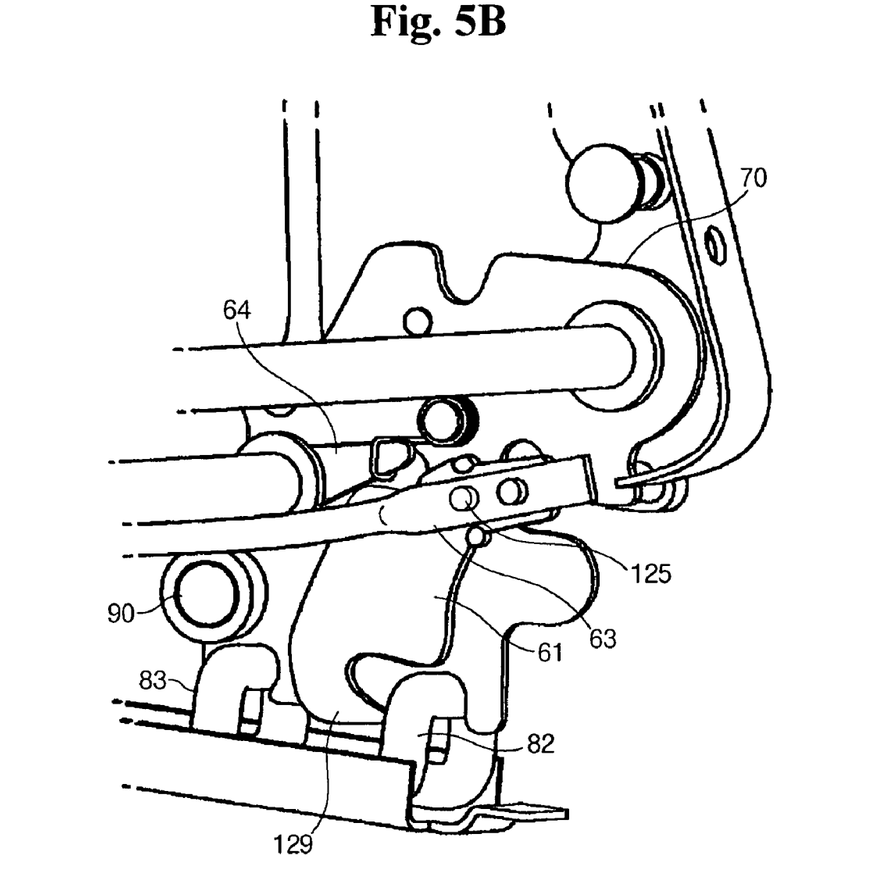

Referring to FIGS. 5A and 5B, hooking portions 129 and 131 are respectively formed in the first front locking plate 61 and the second front locking plate 62, and the first and second front locking plates 61 and 62 can be hooked through these hooking portions 129 and 131 to the ring-shaped first and second front strikers 82 and 83. FIGS. 4A and 4B show a locking state of the front locking portion 60, and FIGS. 5A and 5B show a locking releasing state of the front locking portion 60. A release of the locking state can be realized by a manipulation of the front locking releasing lever 63. The rotating cam 64 is disposed in the vicinity of the first front locking plate 61, and one end of the rotating cam 64 is fixedly connected to the hinge shaft 127 that is fixedly connected to the second front locking plate 62, so that the rotating cam 64 rotates with the second front locking plate 62. Meanwhile, the other end of the rotating cam 64 is extended toward the first front locking plate 61, and it is positioned within an indentation portion 133 formed in the first front locking plate 61 when the front locking portion 60 is in a locking state. When the rotating cam 64 is positioned as shown in FIG. 4B, the second front locking plate 62 is positioned as shown in FIG. 4A. Accordingly, as shown in FIGS. 4A and 4B, the first front locking plate 61 is connected to the first front striker 82, and the second front locking plate 62 is connected to the second front striker 83, so that the front locking portion 60 is in a locking state.

A connecting protrusion 135 is formed on the first front locking plate 61 and a connecting protrusion 137 is formed on the main bracket 70. The connecting protrusions 135 and 137 are connected to each other via a return spring 139. The return spring provides an elastic force such that the first front locking plate 61 is positioned as shown in FIG. 4B. In addition, a return spring 140, which provides an elastic force to urge the rotating cam 64 to the position as shown in FIG. 4B, is provided. One end of the return spring 140 is connected to the rotating cam 64, and the other end thereof is connected to a connecting protrusion 141 that is formed on the main bracket 70, thereby providing an elastic force to the rotating cam 64.

If the front locking releasing lever 63 is rotated in a clockwise direction in FIG. 4B, the first front locking plate 61 also rotates in a clockwise direction (in FIG. 4B) with respect to the hinge shaft 125. Therefore, as shown in FIG. 5B, the hooking portion 129 of the first front locking plate 61 is released from the first front striker 82. At the same time, the rotating cam 64 and the hinge shaft 127 rotate in a counter clockwise direction, in FIG. 4B, in response to the rotation of the first front locking plate 61 in a clockwise direction, in FIG. 4B, so that the hinge shaft 127 and the second front locking plate 62 rotate in a clockwise direction, in FIG. 5A. Accordingly, the hooking portion 131 of the second front locking plate 62 is released from the second front striker 83. Consequently, by rotation of the front locking releasing lever 63, the first front locking plate 61 and the second front locking plate 62 are released from the first front striker 82 and the second front striker 83. The double-folding seat can be separated from a vehicle body in a state in which the front locking portion 60 is released.

Figure 6:
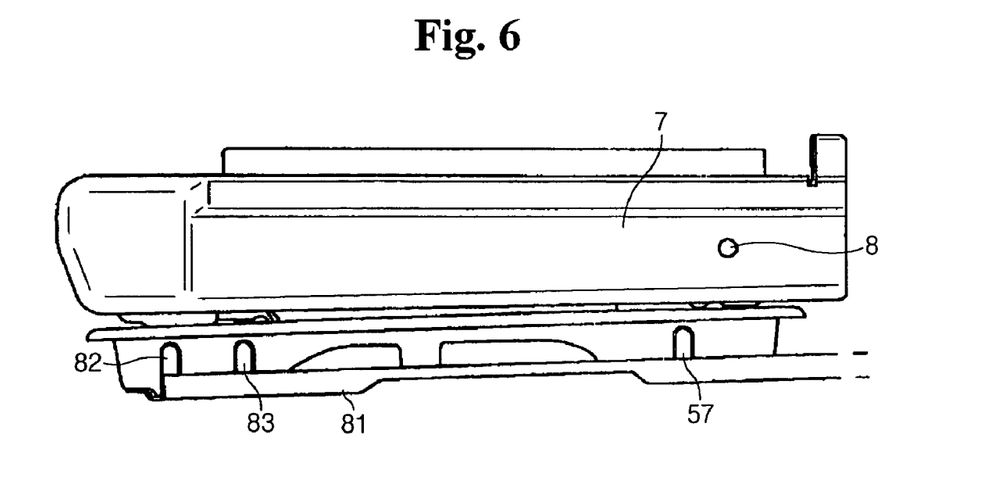
FIG. 6 is a side view of a double-folding seat according to an embodiment of the present invention.

According to an embodiment, as shown in FIG. 6, a hole 8 is formed in a leg cover 7 that is coupled to a side portion of the seat cushion 2. In an embodiment, the hole 8 and the locking cam 56 of the rear locking portion 50 are aligned such that a portion of the locking cam 56 is shown through the hole 8 when the seat cushion 2 is locked to a vehicle body. It is preferable that the portion of the locking cam 56 is painted with a specific color, so that that portion of the locking cam 56 can be more easily shown through the hole 8.

The separated double-folding seat can be connected to the vehicle body as follows. The roller 90 is positioned on a slanted surface of the striker cover 81, and the seat is pushed in a front direction. Thereby, the second front locking plate 62 being locked to the second front striker 83. Then, by lifting a rear portion of the seat, the first front locking plate 61 is locked to the first front striker 82. Accordingly, the front locking portion 60 is locked. Then, by rotating the rear portion of the double-folding seat toward a vehicle body, the rear locking plate 53 of the rear locking portion 50 is locked to the rear striker 57. Consequently, the double-folding seat is installed to the vehicle body.

According to an embodiment of the present invention, the double-folding seat can be double-folded by only one manipulation of the recliner lever. Furthermore, because the double-folding seat can be separated from a vehicle body, a space for loading cargos can be maximized. In addition, because the double-folding seat is provided with the roller, the separated seat can easily be moved. Still furthermore, because the leg cover is provided with the hole, the locking state of the double-folding seat can be seen from outside through the hole.

While this invention has been described in connection with what is presently considered to be the most practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A double-folding seat, comprising:
   a seat cushion;
   a seat back that is rotatably connected to the seat cushion;
   a recliner portion configured to selectively fold the seat back toward the seat cushion and rotate with the seat back;
   a cam fixedly connected to the recliner portion to rotate therewith;
   a cable link portion rotatably connected to the seat cushion, the cable link portion rotating in response to a rotation of the cam;
   a rear locking portion selectively locking a rear portion of the seat cushion to a vehicle body;
   a cable connecting the cable link portion and the rear locking portion to transmit a force generated by a rotation of the cable link portion to the rear locking portion; and
   a front locking portion to which the seat cushion is rotatably connected and connecting a front portion of the seat cushion to the vehicle body, wherein when the seat back is folded by an operation of the recliner portion, a force generated by a rotation of the seat back is transmitted to the rear locking portion via the recliner portion, the cam, the cable link portion, and the cable, so that the rear locking portion is automatically released from the vehicle body by a force transmitted through the cable;
   wherein the rear locking portion comprises:
      a mounting plate that is connected to the seat cushion;
      a rear locking releasing lever one end of which is connected to the cable and the other end of which is fixedly connected to a lever rotating shaft that is rotatably connected to the mounting plate;
      a rear locking plate rotatably connected to the mounting plate and configured to be selectively locked to the vehicle body in response to a rotation thereof;
      a locking cam fixedly connected to the lever rotating shaft to rotate with the rear locking releasing lever, the locking cam selectively blocking a rotation of the rear locking plate depending on a rotation thereof, wherein a blocking of a rotation of the rear locking plate is released when the locking cam rotates by the force transmitted through the cable; and
      a first elastic member elastically connecting the locking cam and the rear locking plate such that a rotation of the locking cam causes a rotation of the rear locking plate.

2. The double-folding seat of claim 1, further comprising a second elastic member providing a force to rotate the seat cushion with respect to the front locking portion.

3. The double-folding seat of claim 1, wherein the rear locking portion is rotatably connected to the seat cushion and wherein the rear locking portion and the front locking portion are connected to each other through a connecting bar, such that, the rear locking portion rotates toward the seat cushion when the seat cushion rotates with respect to the front locking portion.

4. The double-folding seat of claim 1, wherein a rear striker is fixed to the vehicle body and wherein the rear locking plate is configured to be selectively locked to the rear striker.

5. The double-folding seat of claim 1, wherein the mounting plate of the rear locking portion is rotatably connected to the seat cushion, and wherein the mounting plate and the front locking portion are connected to each other through a connecting bar, such that the mounting plate rotates toward the seat cushion when the seat cushion rotates with respect to the front locking portion.

6. The double-folding seat of claim 1, wherein the front locking portion is configured to be separable from the vehicle body.

7. The double-folding seat of claim 6, wherein the front locking portion comprises:
   a main bracket to which the seat cushion is rotatably connected;
   a first front locking plate rotatably connected to the main bracket and configured to be selectively locked to the vehicle body in response to a rotation thereof;
   a second front locking plate fixedly connected to a rotating shaft that is rotatably connected to the main bracket and configured to be selectively locked to the vehicle body in response to a rotation thereof;
   a front locking releasing lever for rotating the first front locking plate such that the first front locking plate is released from the vehicle body; and
   a rotating cam engaged with the first front locking plate to rotate with the first front locking plate and fixedly connected to the rotating shaft so that a rotation of the rotating cam results in a rotation of the second front locking plate that causes the second front locking plate to be released from the vehicle body.

8. The double-folding seat of claim 7, wherein a first front striker and a second front striker are fixed to the vehicle body and wherein the first front locking plate is configured to be selectively locked to the first front striker, and the second front locking plate is configured to be selectively locked to the second front striker.

9. The double-folding seat of claim 7, wherein the front locking portion further comprises a roller that is connected to the main bracket.

10. A double-folding seat, comprising:
    a seat cushion;
    a seat back that is rotatably connected to the seat cushion;
    a recliner portion configured to selectively fold the seat back toward the seat cushion;
    a rear locking portion selectively locking a rear potion of the seat cushion to a vehicle body;
    a front locking portion to which the seat cushion is rotatably connected and connecting a front portion of the seat cushion to the vehicle body; and
    a force transmitting member transmitting a force generated by a folding of the seat back to the rear locking portion, wherein the rear locking portion is configured such that a locking thereof to the vehicle body is automatically released by a force transmitted through the force transmitting member;
    wherein the rear locking portion comprises:
      a mounting plate that is connected to the seat cushion;
      a rear locking releasing lever one end of which is connected to the force transmitting member to receive a force therefrom and the other end of which is fixedly connected to a lever rotating shaft that is rotatably connected to the mounting plate;
      a rear locking plate rotatably connected to the mounting plate and configured to be selectively locked to the vehicle body in response to a rotation thereof;
      a locking cam fixedly connected to the lever rotating shaft to rotate with the rear locking releasing lever, the locking cam selectively blocking a rotation of the rear locking plate depending on a rotation thereof, wherein a blocking of the rear locking plate is released when the locking cam rotates by the force transmitted through the cable; and a first elastic member connecting the locking cam and the rear locking plate such that the rotation of the locking cam causes a rotation of the rear locking plate.

11. The double-folding seat of claim 10, further comprising an a second elastic member providing a force to rotate the seat cushion with respect to the front locking portion.

12. The double-folding seat of claim 10, wherein the rear locking portion is rotatably connected to the seat cushion, and wherein the rear locking portion and the front locking portion are connected to each other through a connecting bar, such that the rear locking portion rotates toward the seat cushion when the seat cushion rotates with respect to the front locking portion.

13. The double-folding seat of claim 10, wherein the force transmitting member comprises:

a cam fixedly connected to the recliner portion to rotate therewith;

a cable link portion rotatably connected to the seat cushion, the cable link portion rotating in response to a rotation of the cam; and a cable connecting the cable link portion and the rear locking portion to transmit a rotating force of the cable link portion to the rear locking portion.

14. The double-folding seat of claim 10, wherein the front locking portion is configured to be separable from the vehicle body.

15. The double-folding seat of claim 14, wherein the front locking portion comprises:

a main bracket to which the seat cushion is rotatably connected;

a first front locking plate rotatably connected to the main bracket and configured to be selectively locked to the vehicle body in response to a rotation thereof;

a second front locking plate fixedly connected to a rotating shaft that is rotatably connected to the main bracket and configured to be selectively locked to the vehicle body in response to a rotation thereof;

a front locking releasing lever for rotating the first front locking plate such that the first front locking plate is released from the vehicle body; and a rotating cam engaged with the first front locking plate to rotate with the first front locking plate and fixedly connected to the rotating shaft so that a rotation of the rotating cam results in a rotation of the second front locking plate that causes the second front locking plate to be released from the vehicle body.

16. The double-folding seat of claim 15, wherein the front locking portion further comprises a roller that is connected to the main bracket.

* * * * *